(12) United States Patent
Rissing et al.

(10) Patent No.: US 6,566,866 B2
(45) Date of Patent: May 20, 2003

(54) SCANNING UNIT

(75) Inventors: Lutz Rissing, Seebruck (DE); Michael Schwabe, Rimsting (DE); Dieter Spark, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 38 days.

(21) Appl. No.: 09/834,479

(22) Filed: Apr. 13, 2001

(65) Prior Publication Data

US 2001/0030535 A1 Oct. 18, 2001

(30) Foreign Application Priority Data

Apr. 13, 2000 (DE) .......................................... 100 18 269

(51) Int. Cl.⁷ .................................................. G01B 7/14
(52) U.S. Cl. ............................ 324/207.21; 324/207.12; 174/52.3
(58) Field of Search ........................ 324/207.2, 207.21, 324/207.22, 207.24, 207.25, 252; 338/32 R, 32 H; 174/52.1, 52.2, 52.3; 29/835

(56) References Cited

U.S. PATENT DOCUMENTS

| | | | | |
|---|---|---|---|---|
| 4,931,719 A | * | 6/1990 | Murata et al. | ............... 323/368 |
| 5,233,295 A | * | 8/1993 | Murata et al. | ........... 324/207.2 |
| 5,250,925 A | * | 10/1993 | Shinkle | .................... 338/32 R |
| 5,508,611 A | * | 4/1996 | Schroeder et al. | ........... 324/252 |
| 5,695,393 A | * | 12/1997 | Granziera | ................... 451/390 |

FOREIGN PATENT DOCUMENTS

| | | |
|---|---|---|
| DE | 77 11 655 | 10/1978 |
| DE | 39 25 745 | 2/1990 |
| DE | 41 25 715 | 10/1995 |
| DE | 44 32 468 | 10/1995 |
| DE | 196 07 179 | 7/1997 |

* cited by examiner

*Primary Examiner*—Edward Lefkowitz
*Assistant Examiner*—Reena Aurora
(74) *Attorney, Agent, or Firm*—Kenyon & Kenyon

(57) ABSTRACT

A scanning unit for a magnetic position measuring device is described. The scanning unit includes a carrier body having at least one recess and at least one bore hole in communication with the recess. A detector unit, having one or more detector elements and an electrical connecting lead, is arranged in the area of the recess. The electric connecting lead is disposed through the bore hole. A covering element, covering the recess and protecting the elements arranged therein against mechanical damage, is arranged over the recess. A filling material is provided in the remaining free areas of the recess under the covering element.

46 Claims, 3 Drawing Sheets

SCANNING UNIT

BACKGROUND OF THE INVENTION

The present invention generally relates to a scanning unit, and more particularly, to a scanning unit for a magnetic position measuring device.

Magnetic position measuring devices usually include a magnetic measuring graduation that includes alternately arranged subareas having different magnetisation intensities and a scanning unit movable relative thereto in the direction of measurement. A detector unit, among other things, having suitable magnetically sensitive detector elements is provided on the sides of the scanning unit. Thin layers made of a magneto-resistive material are often used as detector elements, which however are extremely sensitive to mechanical influences. Therefore, if a magnetic position measuring device having such a scanning unit is used in a machine tool, the detector elements, i.e., the detector unit, may become damaged by coolants, chips, etc. during the measuring operation. This in turn would result in failure of the position measuring device.

In order to prevent damage, it is known in such a position measuring device that a detector unit arranged in a recess of a carrier element can be protected with a covering element arranged over it. If a thin metal foil is provided as the covering element, it is, however, relatively difficult to arrange this foil to be exactly flat in this area. However, if the metal foil is not exactly flat, the distance between the detector elements and the measuring graduation will vary for a given scanning distance between the measuring graduation and the covering element. Due to the sensitive dependence of the detector signals on this distance, undesirably fluctuating signal amplitudes may result. Furthermore, a not exactly flat arrangement of the metal foil may result in metal chips or other impurities becoming wedged at this point between the measuring graduation and the scanning unit.

SUMMARY OF THE INVENTION

An object of the present invention is therefore to provide a scanning unit, in particular for magnetic position measuring devices, whose detector unit is reliably secured against mechanical influences.

The scanning unit according to an embodiment of the present invention offers a series of advantages compared to previous devices. Thus, a stable and compact design of the overall scanning unit results due to the filling material provided inside the recess. Furthermore, the measures according to the present invention allow an extremely accurate flat arrangement of a metal foil to be provided as the covering element, which protects the detector unit against mechanical influences. This in turn results in the desired insensitivity to deposition of contaminants, as well as in stable, low-noise scanning signals.

Furthermore, if the detector unit is contacted using flexible printed conductors, a relatively simple, easy to automate contacting can be implemented.

If also the hole through which the connecting leads are run is filled with the filling material, the electric connecting leads in the scanning unit are also reliably protected against mechanical damage.

Due to the use of a filling material in the recess in the scanning unit according to an embodiment of the present invention, which contracts, i.e., shrinks, as it sets, when a metal foil is used as a covering element it adapts itself to the contour of the detector elements and the support elements. This results in a rigid support of the metal foil which prevents any failure of the adhesive bond between the foil and the support element. Furthermore, the shrinkage of the filling material ensures that only thrust and pressure stresses occur in the flat adhesive surfaces, which reliably prevents the metal foil from peeling off.

As an additional advantage of the use of a suitable filling material, the creep distances for impurities are increased, should the metal foil be mechanically damaged, for example.

According to embodiments of the present invention, scanning units based on other physical scanning principles, for example, optical, inductive, or capacitive systems, can also be formed in a position measuring device. Instead of the magnetically sensitive detector elements, corresponding alternative detector elements could then be provided. In addition, in the case of an optical position measuring device, the covering element may be designed to be transparent.

The scanning unit designed according to an embodiment of the present invention can be used in both linear and rotational position measuring devices. In one embodiment, the invention is a scanning unit for a magnetic position measuring device that includes a carrier body having at least one recess and at least one bore hole, the bore hole being in communication with the recess, detector unit, arranged in the recess, having at least one electrical connecting lead disposed through the bore hole, a covering element adapted to cover the recess, and a filling material adapted to fill a remaining area of the recess under the covering element.

In a different embodiment, the invention is a scanning unit for a magnetic position measuring device, comprising a carrier body having at least one recess and at least one bore hole, the bore hole being in communication with the recess, a detector unit, arranged in the recess, having at least one electrical connecting lead disposed through the bore hole, and a covering element adapted to cover the recess. The invention also includes a filling material adapted to fill a remaining area of the recess under the covering element and at least one support element arranged in the area of the recess and adapted to support the covering element. The invention can also include at least one assembly stop being arranged in said recess for accurate positioning of said detector unit.

DETAILED DESCRIPTION

Figure 1:
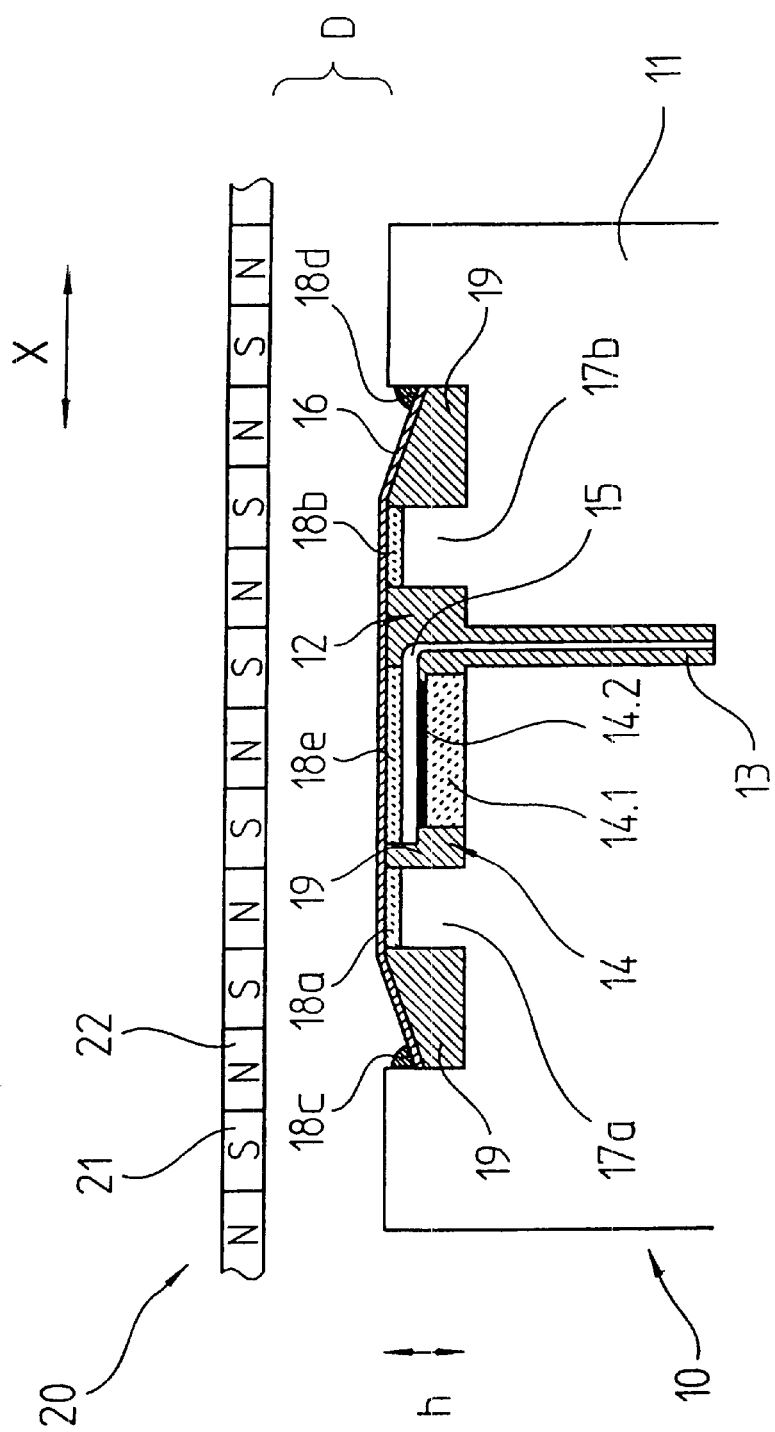
FIG. 1 illustrates an embodiment of the scanning unit according to the present invention in conjunction with a magnetic measuring graduation to be scanned.
Figure 2:
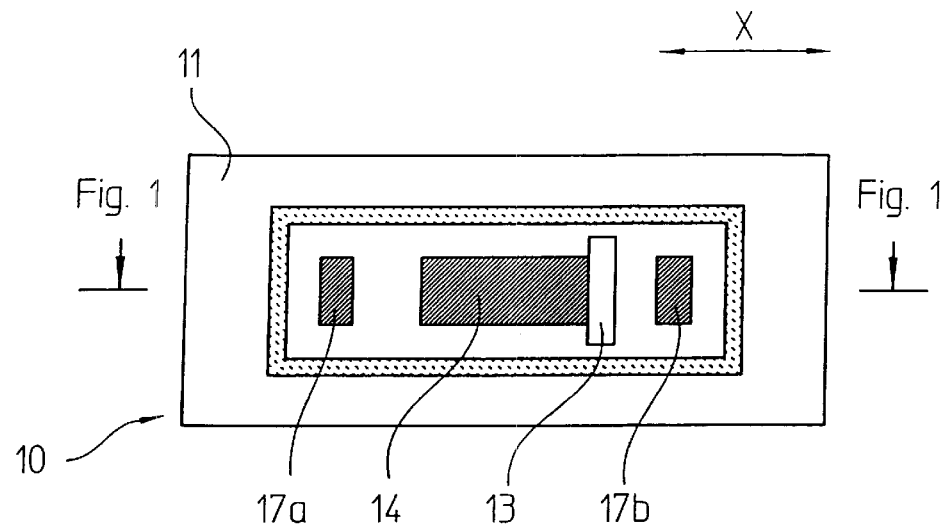
FIG. 2 depicts a top view of an embodiment of the scanning unit of FIG. 1 in a partially assembled state.

FIG. 1 schematically shows a partially sectioned view of an embodiment of a scanning unit 10 according to the present invention; FIG. 2 shows a top view of the partially assembled scanning unit.

Next to scanning unit 10, a magnetic measuring graduation 20 can be seen, which is scanned using scanning unit 10 to generate position-dependent scanning signals in the given measuring direction x. FIGS. 1 and 2 are not drawn to scale.

Such a magnetic position measuring device can be used, for example, in machine tools in order to determine the relative position of the work piece and the tool with a high accuracy. The scanning signals generated as measuring graduation 20 is scanned using scanning unit 10 are sent to an analysis unit (not shown in FIG. 1), for example, a numerical machine tool controller where they are further processed.

Magnetic measuring graduation 20 scanned using scanning unit 10 according to an embodiment of the present invention at scanning distance D is designed as known and includes a periodic sequence of subareas 21, 22 having different magnetisation intensities. Different known magnetisation variants can be used on the sides of measuring graduation 20. Measuring graduation 20 can also be either a linear measuring graduation or a rotational measuring graduation; in the latter case measuring graduation 20 may be arranged on a suitable cylinder drum, for example.

Scanning unit 10 according to an embodiment of the present invention includes a stable carrier body 11, on which the other components of scanning unit 10 are arranged. In the embodiment illustrated, the carrier body is made of aluminium. On the side facing measuring graduation 20, carrier body 11 has a recess 12 in which in turn various functionally relevant elements, which will be explained below, are arranged. Recess 12 in carrier body 11 has a rectangular design in this example as can be seen from the top view of FIG. 2; the longitudinal axis of the rectangle is oriented in the measuring direction x. In one exemplary embodiment, depth h of recess 12 can be h=900 μm.

In the area of recess 12, a channel or bore hole 13 is also provided in carrier body 11, which can also be seen in FIG. 1. In the present example, bore hole 13 has a rectangular cross-section; the longitudinal axis of the rectangle is perpendicular to the measuring direction x and perpendicular to the plane of the drawing. The bore hole can be, for example, 3 mm×10 mm large in one embodiment.

In the central area of recess 12, detector unit 14 required for scanning the measuring graduation is arranged. In order to scan magnetic measuring graduation 20, detector unit 14 has a plurality of magnetic field-sensitive detector elements 14.2. In the present example, detector elements 14.2 are magneto-resistive thin layers arranged in a known manner on a carrier substrate 14.1 made of glass. Detector unit 14 is preferably secured in recess 12 by adhesive bonding.

Detector unit 14 is electrically contacted by one or more electrical connecting leads which in the present example are designed as flexible printed conductors, i.e., flexible printed circuits. The flexible printed conductor is arranged on the surface of detector unit 14, i.e., detector elements 14.2, and is preferably secured on detector unit 14 by adhesive bonding. Two groups of electric contacting points spaced in measuring direction x are provided between the flexible printed conductor and detector unit 14.

Figure 3:
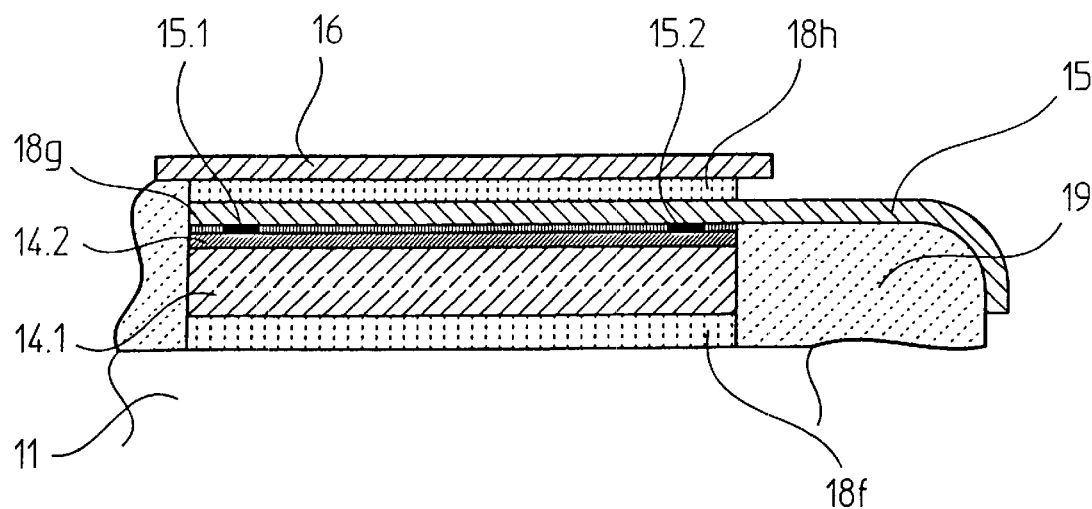
FIG. 3 illustrates an enlarged detail of an embodiment of the scanning unit of FIG. 1.

To describe the contacting, reference is also made to the description of FIG. 3 that follows.

Connecting lead 15, i.e., the flexible printed conductor, leads to the outside through bore hole 13 in carrier body 11 of scanning unit 10 for connecting the detector unit to a downstream analysis unit.

In order to protect the elements of scanning unit 10 arranged in recess 12, a covering element 16 which fully covers recess 12 is arranged over recess 12. In the present example, covering element 16 is designed as a thin, resistant metal foil having a thickness of approximately 20–30 μm. An amorphous iron-nickel alloy has been found to be particularly advantageous as a material for the metal foil, since it can withstand extremely high mechanical stresses. This material is also non-magnetic and therefore does not influence the reception of scanning signals from the scanning of magnetic measuring graduation 20.

Support elements 17a, 17b are also arranged in the area of recess 12; on these support elements rests covering element 16, that can be a metal foil. Covering element 16 is bonded to support elements 17a, 17b by adhesive bonding. The adhesive layers required are labelled in FIG. 1 as 18a, 18b.

As an alternative, other bonding methods could also be used at this point, for example, soldering, hard soldering, or welding.

In the example of FIGS. 1 and 2, support elements 17a, 17b have a height equal to depth of recess 12. The respective top sides of support elements 17a, 17b, are thus flush with the top of carrier element 11.

As an alternative, the support elements could also have a height that is greater than the depth of the recess, so that the support elements protrude from the recess. In this variant it would be advantageous if also the detector unit were arranged in the recess so that its top would also protrude from the recess. Such an arrangement would also contribute to a metal foil arranged on the top adapting to the detector unit's contour and not becoming detached.

In the example shown, covering element 16 is also connected to carrier body 11 in its edge areas. For this purpose, the metal foil is bent downward in the present example and adhesive 18c, 18d is applied between the metal foil and the edge of recess 12 in carrier body 11. In this manner an extremely tight adhesive bond is guaranteed between covering element 16 and carrier body 11. Alternative bonding methods can be used instead of adhesion in this location as well.

In this exemplary embodiment, covering element 16 is also bonded to the flexible printed conductor in the area of detector unit 14, the bond being an adhesive surface bond. In FIG. 1, reference number 18e denotes the adhesive layer, however, other bonding methods can also be used here as well.

An epoxy-based adhesive material is preferably used for the various above-described adhesive bonds. One important factor in selecting a suitable adhesive here is its resistance to mechanical and chemical influences.

In another embodiment of the present invention, the free areas remaining in recess 12 under covering element 16 can be filled with a filling material 19. A casting compound is selected as filling material 19 which fills the space between covering element 16 and carrier body 11 and sets after filling. Filling material 19 is filled through bore hole 13 in carrier body 11 through which also connecting lead 15 is run. In the present embodiment, filling material 19 also fills the area of bore hole 13, i.e., of the channel. In this manner, connecting lead 15 in scanning unit 10 is also protected against mechanical stresses.

A low-viscosity casting compound having a thermal expansion coefficient that is at least close to that of carrier body 11 and detector unit 13 is preferably selected as filling material 19. Thus, thermal stresses caused by possible temperature changes can be avoided within scanning unit 13. Furthermore, it has been found advantageous if a suitable casting compound made of a material that contracts, i.e., shrinks as it sets, is selected. In this manner a particularly intimate contact between covering element 16, such as a metal foil, and detector unit 13 is ensured. In addition, by selecting such a material, detachment of the metal foil from detector elements 14.2 can be reliably prevented.

FIG. 3 shows an enlarged detail of FIG. 1, showing in particular the area of scanning unit 10 with detector unit 14. Carrier substrate 14.1 of detector unit 14 is arranged on carrier element 11 over an adhesive layer 18f; detector elements 14.2 in the form of a thin magneto-resistive layer are located on carrier substrate 14.1. Detector elements 14.2 are conductively connected to connecting lead 15, designed as a flexible printed conductor, in this embodiment via two groups of contact points 15.1, 15.2 spaced in the measuring direction x. Other contact points (not shown) extend perpendicularly to the plane of the drawing. Furthermore, in the embodiment illustrated, another adhesive layer 18g for securing the flexible printed conductor on the surface can be provided between connecting lead 15, and detector unit 14. Finally, an additional adhesive layer 18h can be arranged over connecting lead 15, formed for example by the flexible printed conductor, through which a connection is established to covering element 16, such as a thin metal foil, over it.

As an alternative to the above-described example, adhesive layers 18g, 18h for securing the flexible printed conductor can be omitted. Of course, alternative embodiments of the scanning unit can also be implemented within the teaching of the present invention.

Figure 4A:
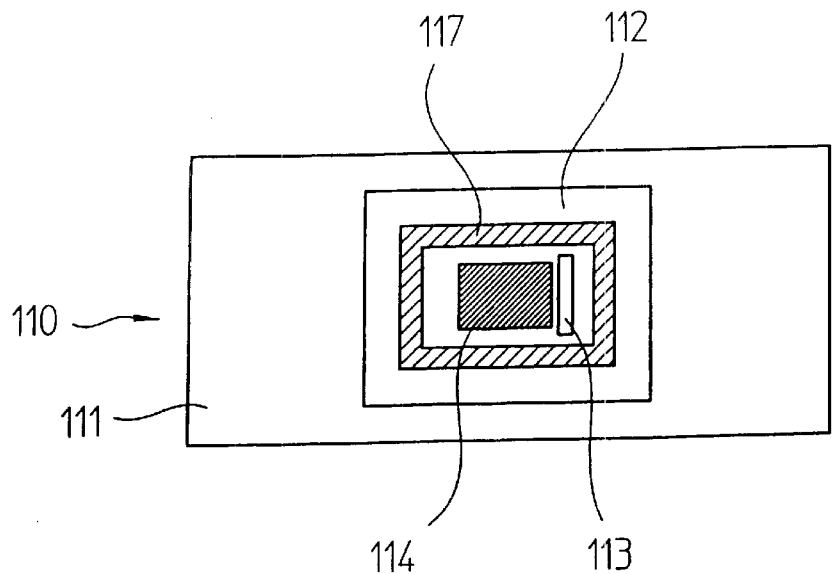
FIGS. 4a and 4b depict a top view of alternative embodiments of a scanning unit according to the present invention in partially assembled states.
Figure 4B:
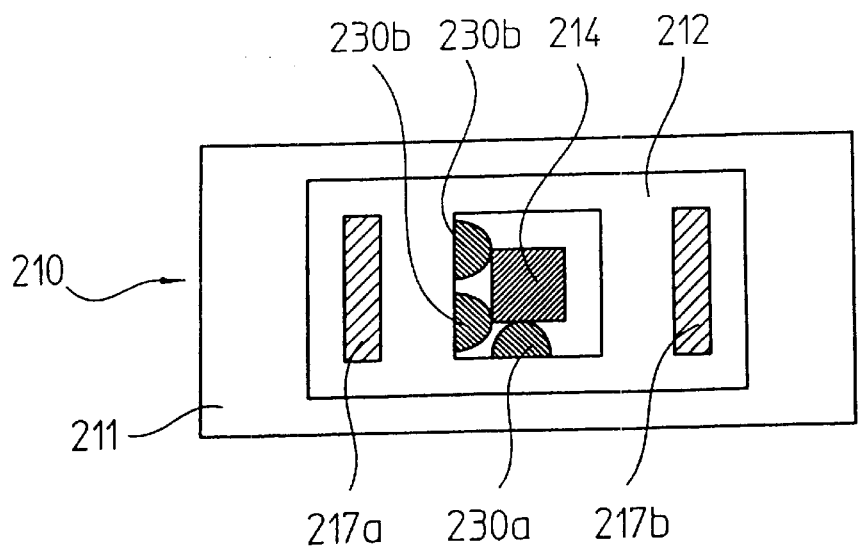

FIGS. 4a and 4b show top views of other possible embodiments of scanning units according to the present invention in a partially assembled state.

Scanning unit 110 shown in FIG. 4a also has a rectangular recess 112 in a stable carrier body 111 in which detector unit 114 is arranged. Next to the detector unit, rectangular bore hole 113 can be seen, through which the electrical connecting lead is run in the contacted state. In contrast to the previous example, not only two support elements spaced in the measuring direction and having a rectangular cross-section are provided in recess 112, but instead, an elevation running circumferentially in recess 112 and completely surrounding detector unit 114 is used as support element 117. A covering element, not shown in FIG. 4a, for example, a metal foil, covers support element 117. Otherwise the rest of the basic design corresponds to that of the previous embodiment.

A variant similar to the first example of a scanning unit 210 according to the present invention is shown in FIG. 4b in a partially assembled state. As in the first embodiment, the two support elements 217a, 217b are arranged in recess 212 of carrier element 211. Detector unit 214 is located between support elements 217a and 217b, with three assembly stops 230a, 230b, and 230c being arranged in recess 212 for accurate positioning of detector unit 214. The detector unit can be automatically positioned in the right location using assembly stops 230a–230c arranged at right angles to one another in this example and subsequently secured and contacted. In the present example, assembly stops 230a–230c are semicircular elevations in an additional recess. By pushing the detector unit from top right to the left and down, correct positioning of the detector unit in the desired position can be ensured.

In different embodiments, additional bore holes or channels can be provided in the carrier body, for example, through which the filling material is filled in the inner space of the scanning unit.

Furthermore, alternative contacting versions for the detector unit are also possible. Instead of using the flexible printed conductor for contacting the detector unit, conventional wire bonding can also be provided, for example. If an alternative contacting is provided, for example as shown in FIGS. 1 and 2, it has been found to be advantageous if an additional protective layer is provided between the detector elements of the detector unit and the covering element in order to protect the sensitive detector elements against mechanical influences as well as against possible electrical surges in this area. While such a protective layer is formed in the above example by the flexible printed conductor, in the case of other contacting methods a suitable protective lacquer or a suitable protective foil could also be provided. It is also possible to contact the detector unit optionally from its backside and to run the connecting lead outward through a suitable bore hole in the carrier body.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A scanning unit for a magnetic position measuring device, comprising:

a carrier body having at least one recess and at least one bore hole, the bore hole being in communication with the recess;

a detector unit, arranged in the recess, having at least one electrical connecting lead disposed through the bore hole;

a covering element adapted to cover the recess; and a filling material adapted to fill a remaining area of the recess under the covering element;

wherein the filling material comprises a low-viscosity casting compound having a thermal expansion coefficient approximately equal to thermal expansion coefficients of the carrier body and the detector unit.

2. The scanning unit according to claim 1, further comprising at least one support element arranged in the area of the recess and adapted to support the covering element.

3. The scanning unit according to claim 2, wherein the covering element is bonded to the support element.

4. The scanning unit according to claim 3, wherein edge areas of the covering element are bonded to the carrier body.

5. The scanning unit according to claim 2, wherein the height of the support element is greater than the depth of the recess and the detector unit is arranged in the recess so that a top portion of the detector unit protrudes from the recess.

6. The scanning unit according to claim 1, wherein the electrical connecting lead comprises a flexible printed conductor located on a side of the detector unit facing the covering element.

7. The scanning unit according to claim 6, further comprising two groups of electrical contact points disposed between the detector unit and the electrical connecting lead and spaced in the measuring direction.

8. The scanning unit according to claim 6, wherein the flexible printed conductor is bonded to the surface of the detector unit.

9. The scanning unit according to claim 6, wherein the covering element is bonded to the flexible printed conductor adjacent to the detector unit.

10. The scanning unit according to claim 1, further comprising a protective layer arranged between the detector unit and the covering element.

11. The scanning unit according to claim 1, wherein the covering element comprises a thin, resistant, non-magnetic metal foil.

12. The scanning unit according to claim 11, wherein the metal foil comprises an amorphous nickel-iron alloy.

13. The scanning unit according to claim 1, wherein the filling material fills the bore hole.

14. The scanning unit according to claim 1, wherein the filling material comprises a material that contracts as the material sets.

15. The scanning unit according to claim 1, wherein the carrier body comprises aluminium.

16. The scanning unit according to claim 1, further comprising at least one assembly stop being arranged in said recess for accurate positioning of said detector unit.

17. The scanning unit according to claim 16, wherein said at least one assembly stop includes three assembly stops being arranged at right angles to one another in said recess.

18. A scanning unit for a magnetic position measuring device, comprising:
   a carrier body having at least one recess and at least one bore hole, the bore hole being in communication with the recess;
   a detector unit, arranged in the recess, having at least one electrical connecting lead disposed through the bore hole;
   a covering element adapted to cover the recess;
   a filling material adapted to cover the recess;
   a filling material adapted to fill a remaining area of the recess under the covering element; and
   at least one support element arranged entirely in the area of the recess and adapted to support the covering element, the at least one support element extending itself a defined height from a base of the recess.

19. The scanning unit according to claim 18, wherein the covering element is bonded to the support element.

20. The scanning unit according to claim 18, wherein the height of the support element is greater than the depth of the recess and the detector unit is arranged in the recess so that a top portion of the detector unit protrudes from the recess.

21. The scanning unit according to claim 18, wherein the covering element comprises a thin, resistant, non-magnetic metal foil.

22. The scanning unit according to claim 21, wherein the metal foil comprises an amorphous nickel-iron alloy.

23. The scanning unit according to claim 18, wherein edge areas of the covering element are bonded to the carrier body.

24. The scanning unit according to claim 18, wherein the electrical connecting lead comprises a flexible printed conductor located on a side of the detector unit facing the covering element.

25. The scanning unit according to claim 18, further comprising a protective layer arranged between the detector unit and the covering element.

26. The scanning unit according to claim 18, wherein the filling material comprises a low-viscosity casting compound having a thermal expansion coefficient approximately equal to a thermal expansion coefficients of the carrier body and the detector unit.

27. The scanning unit according to claim 18, wherein the filling material comprises a material that contracts as the material sets.

28. The scanning unit according to claim 18, wherein the carrier body comprises aluminum.

29. The scanning unit according to claim 18, further comprising at least one assembly stop being arranged in said recess for accurate positioning of said detector unit.

30. The scanning unit according to claim 29, wherein said at least one assembly stop includes three assembly stops being arranged at right angles to one another in said recess.

31. A scanning unit for a magnetic position measuring device comprising:
   a carrier body having at least one recess and at least one bore hole, the bore hole being in communication with the recess;
   a detector unit, arranged in the recess, having at least one electrical connecting lead disposed through the bore hole;
   a covering element adapted to cover the recess;
   a filling material adapted to fill a remaining area of the recess under the covering element; and
   at least one assembly stop being arranged in said recess for accurate positioning of said detector unit;
   wherein said at least one assembly stop includes three assembly stops arranged at right angles to one another in said recess.

32. The scanning unit according to claim 31, further comprising at least one support element arranged in the area of the recess and adapted to support the covering element.

33. The scanning unit according to claim 32, wherein the covering element is bonded to the support element.

34. The scanning unit according to claim 32, wherein the height of the support element is greater than the depth of the recess and the detector unit is arranged in the recess so that a top portion of the detector unit protrudes from the recess.

35. The scanning unit according to claim 33, wherein edge areas of the covering element are bonded to the carrier body.

36. The scanning unit according to claim 31, wherein the electrical connecting lead comprises a flexible printed conductor located on a side of the detector unit facing the covering element.

37. The scanning unit according to claim 36, further comprising two groups of electrical contact points disposed between the detector unit and the electrical connecting lead and spaced in the measuring direction.

38. The scanning unit according to claim 36, wherein the flexible printed conductor is bonded to the surface of the detector unit.

39. The scanning unit according to claim 36, wherein the covering element is bonded to the flexible printed conductor adjacent to the detector unit.

40. The scanning unit according to claim 31, further comprising a protective layer arranged between the detector unit and the covering element.

41. The scanning unit according to claim 31, wherein the covering element comprises a thin, resistant, non-magnetic metal foil.

42. The scanning unit according to claim 41, wherein the metal foil comprises an amorphous nickel-iron alloy.

43. The scanning unit according to claim 31, wherein the filling material fills the bore hole.

44. The scanning unit according to claim 31, wherein the filling material comprises a low-viscosity casting compound having a thermal expansion coefficient approximately equal to thermal expansion coefficients of the carrier body and the detector unit.

45. The scanning unit according to claim 31, wherein the filling material comprises a material that contracts as the material sets.

46. The scanning unit according to claim 31, wherein the carrier body comprises aluminum.

* * * * *